(No Model.)
J. YARRICK & E. MEISTER.
BRAKE FOR CARS.
No. 396,132. Patented Jan. 15, 1889.
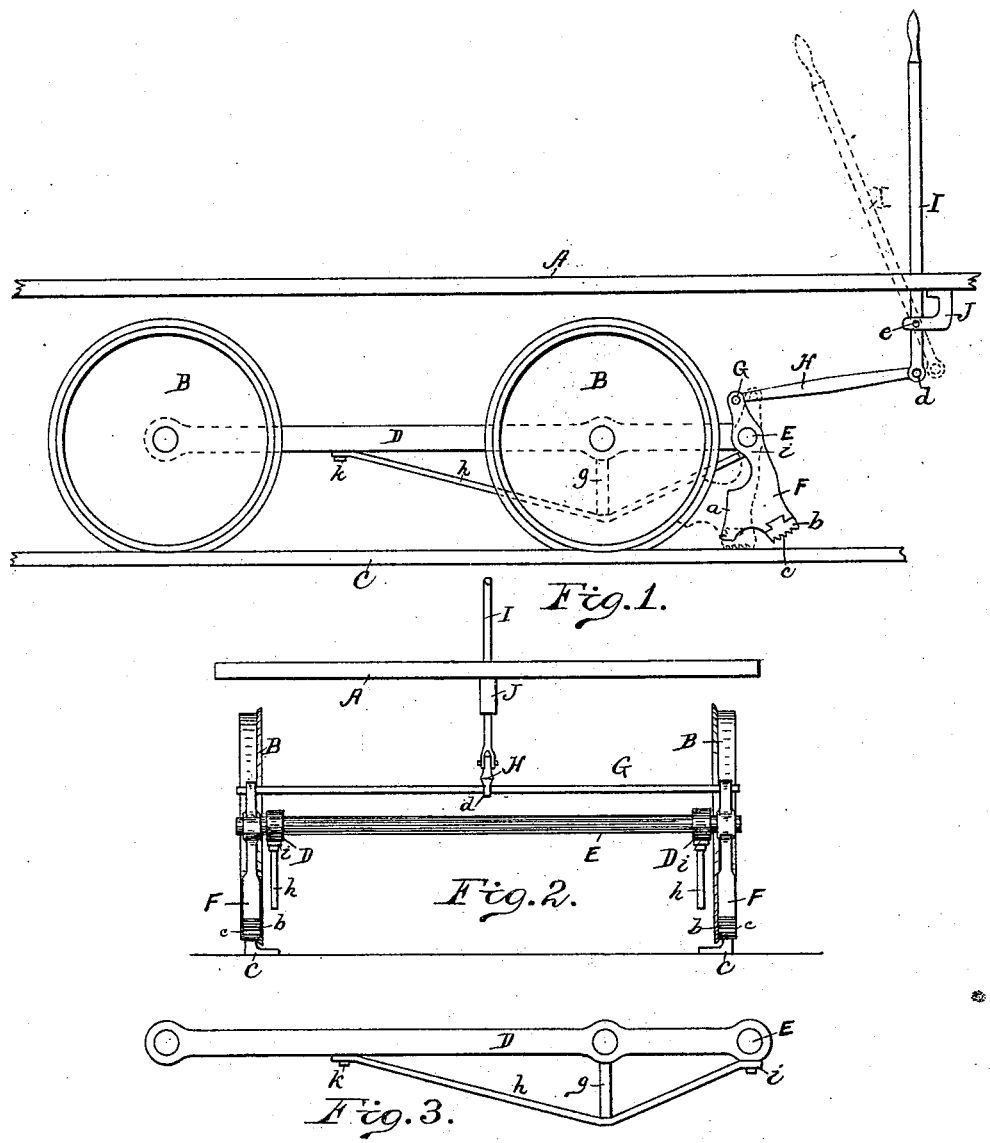
WITNESSES:
John F. Hallroch
John Lefferts.
INVENTOR
John Yarrick
Edward Meister
by Walter W. Calmore
Attorney

UNITED STATES PATENT OFFICE.

JOHN YARRICK AND EDWARD MEISTER, OF PHILADELPHIA, PENNSYLVANIA.

BRAKE FOR CARS.

SPECIFICATION forming part of Letters Patent No. 396,132, dated January 15, 1889.

Application filed May 1, 1888. Serial No. 272,492. (No model.)

*To all whom it may concern:*

Be it known that we, JOHN YARRICK and EDWARD MEISTER, citizens of the United States, residing at Philadelphia, in the county of Philadelphia and State of Pennsylvania, have invented certain new and useful Improvements in Brakes for Cars, of which the following is a specification, reference being had therein to the accompanying drawings.

Our invention relates to improvements in brakes for railroad and street cars; and the object of our invention is to furnish a brake which will bring the car to a full stop when the ordinary brake would fail to do so, and which will at all times act in a much shorter time and with more certainty than the ordinary brake.

Our invention is a combination of the wheel and track brakes, and it is so arranged that the pressure is applied to both the wheel and track at the same time.

In the drawings, Figure 1 is a side elevation of part of the floor and wheels of a car embodying our invention; Fig. 2, an end view of the same; Fig. 3, a side elevation of one of the frames carried by the axles of the wheels, and which carries the pivot upon which the brake works; and Fig. 4, a side elevation of a modified form of shoe for the track-brake.

A is the floor or platform of the car; B B, the wheels; C, the track; D, a beam or frame carried by the axles of the wheels B, and which projects beyond the forward axle, as shown in Fig. 1; and carries at its forward end a shaft, E. Pivoted upon the shaft E, and directly over the rail C and in front of the wheels B, is the brake F, which consists of a piece of metal the rear side, *a*, of which is adapted to bear against the tread of the wheel, as shown by dotted lines, Fig. 1, and the bottom of which carries a shoe, *b*, which is preferably furnished with teeth *c*, which bears upon the rail.

The upper ends of the shoes F are connected by a rod, G, or its equivalent, to which one end of a connecting-rod, H, is secured. The other end of this rod H is secured to the lower end of the operating-lever I at *d*. The operating-lever I is pivoted to a bracket, J, at *e*.

The operation of the brake is as follows: The operating-lever I is drawn back, drawing connecting-rod H and the upper ends of brake F forward, throwing the rear end, *a*, of the brake against the tread of the wheel and the lower end or shoe, *b*, down against the rail. The greater the momentum of the car the greater will be the friction between the wheels and rails and the brakes F. As that part of the brake which comes in contact with the rail would have to take the greatest wear, it is made removable, as shown at *b*, Fig. 1, and instead of a steel or cast-iron shoe, *b*, furnished with teeth *c*, as shown in Figs. 1 and 2, we may use a shoe somewhat similar to that shown in Fig. 4, which consists of a brush furnished with stiff wires *f*, of iron or steel.

In order that the outer ends of the beams D may not be bent by the strains caused by the brake coming in violent contact with the rail, we brace this end, as shown in Figs. 1 and 3.

*g* is a rod extending downward from the beam D, and *h* is a rod one end of which is secured to the outer end of said frame at *i*, and which passes under rod *g* and has its other end secured to frame D at *k*.

Having thus described our invention, we claim—

1. The combination, with brake F, pivoted at E and adapted to engage with both the rail and wheel, of rods G and H and lever I, substantially as set forth.

2. The combination of frame D, brake F, and connecting and operating levers, substantially as described.

3. The combination, with the brake F, of the removable shoe *b*, substantially as described.

4. In the herein-described brake, the combination, with frame D, of rods *g* and *h*, substantially as and for the purposes set forth.

In testimony whereof we affix our signatures in the presence of two witnesses.

JOHN YARRICK.
EDWARD MEISTER.

Witnesses:
D. A. MINNICK,
A. MINNICK.